United States Patent

Mumford et al.

Patent Number: 5,103,629
Date of Patent: Apr. 14, 1992

[54] GAS TURBINE CONTROL SYSTEM HAVING OPTIMIZED IGNITION AIR FLOW CONTROL

[75] Inventors: Stephen E. Mumford, Longwood; William L. McCarty, Winter Springs, both of Fla.

[73] Assignee: Westinghouse Electric Corp., Pittsburgh, Pa.

[21] Appl. No.: 439,112

[22] Filed: Nov. 20, 1989

[51] Int. Cl.$^5$ .............................................. F02C 7/264
[52] U.S. Cl. .............................. 60/39.06; 60/39.141
[58] Field of Search ............ 60/39.06, 39.141, 39.142, 60/39.281, 39.827

[56] References Cited

U.S. PATENT DOCUMENTS

| | | | |
|---|---|---|---|
| 3,421,317 | 1/1969 | Bedford | 60/39.281 |
| 3,470,691 | 10/1969 | Smith | 60/39.142 |
| 3,830,055 | 8/1974 | Erlund | 60/39.281 |
| 4,308,463 | 12/1981 | Giras et al. | 290/1 |

OTHER PUBLICATIONS

Sobey et al. *Control of Aircraft and Missile Powerplants* Wiley & Sons, New York, 1963 pp. 32-33.

Patent Abstracts of Japan, vol. 4, No. 167 (M-42) (649) JP-A-55-114851, Nov. 19, 1980.

*Primary Examiner*—Louis J. Casaregola

[57] ABSTRACT

Method and apparatus for generating an ignition enabling signal for use with a given combustion turbine having an ignition system which ignites the turbine in response to an enabling signal, wherein a turbine speed signal is given, is shown to include a sensor for generating an ambient air temperature signal, a reference member for generating a reference signal representative of the turbine speed at which optimum air flow exists for ignition, a comparator for comparing the reference signal to an adjusted speed signal and for generating the ignition enabling signal when the adjusted speed signal exceeds the reference signal and for providing the enabling signal to the ignition system. The adjusted speed signal is generated by modifying the turbine speed signal in response to the ambient air temperature signal. Such modification is achieved by summing the turbine speed signal with a bias speed factor. The bias speed factor is representative of the difference between optimum turbine ignition speed and that turbine speed necessary for optimum ignition air flow to exist in said combustion turbine at such ambient temperature.

13 Claims, 8 Drawing Sheets

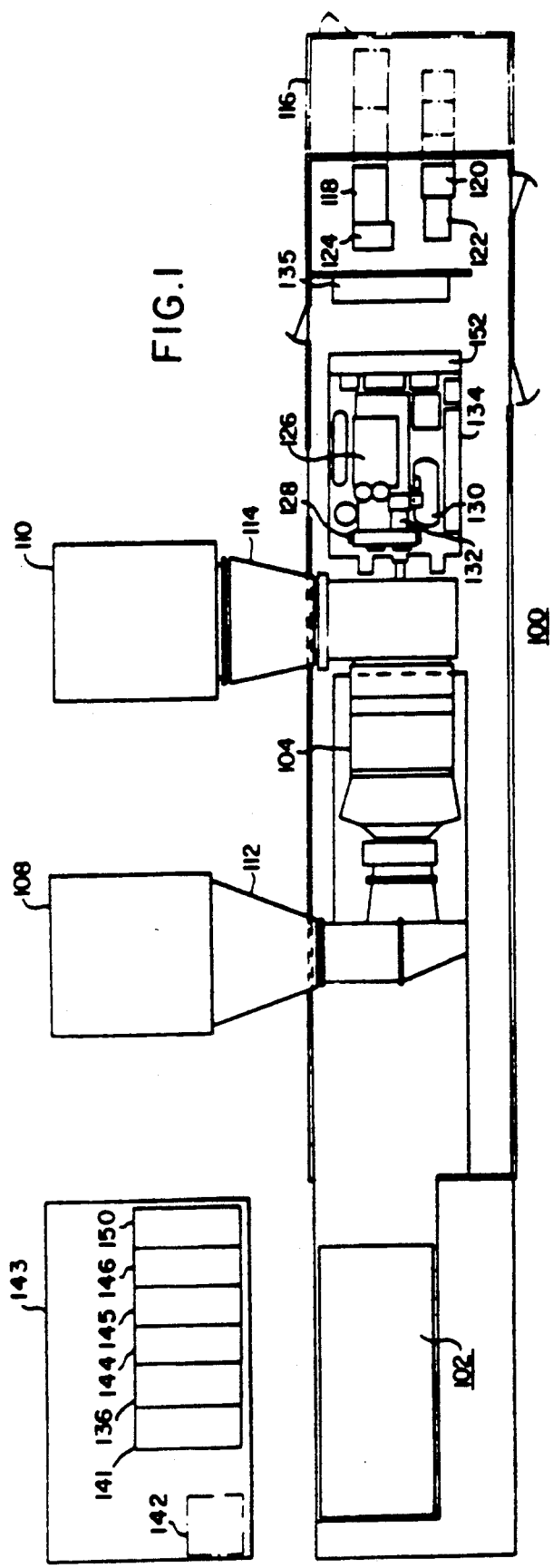
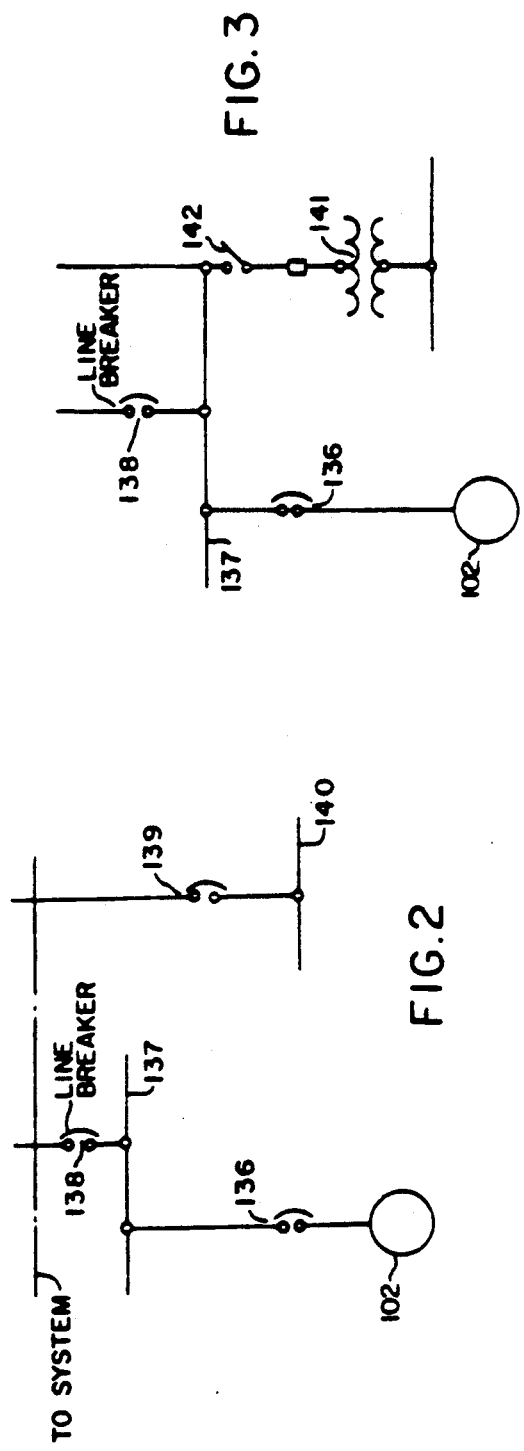
FIG.1
FIG.2
FIG.3

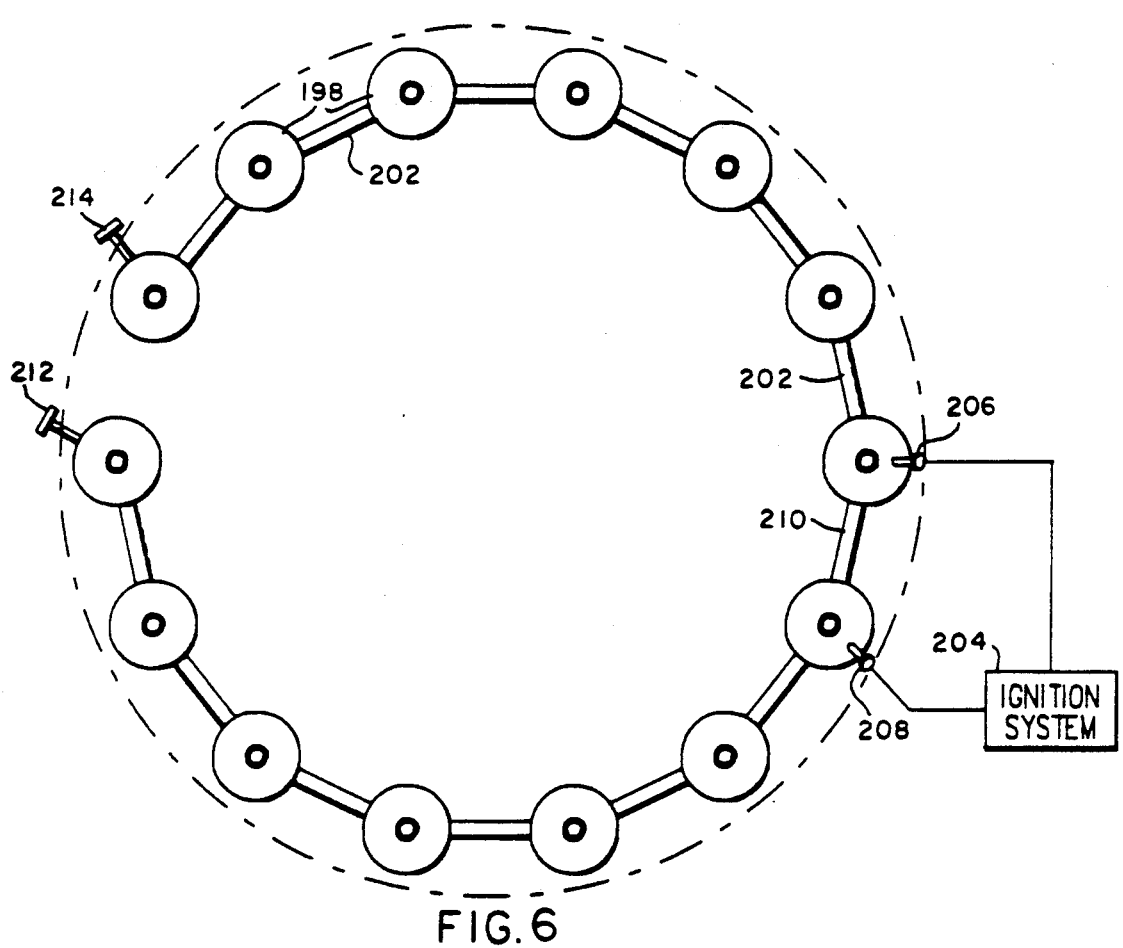
FIG. 6
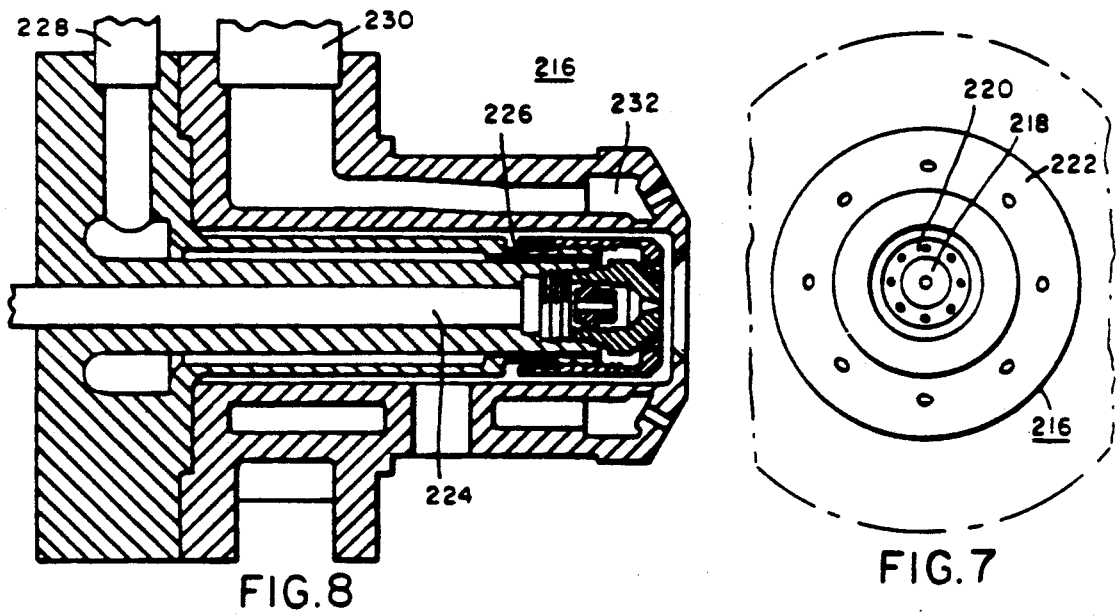
FIG. 8
FIG. 7

GAS TURBINE CONTROL SYSTEM HAVING OPTIMIZED IGNITION AIR FLOW CONTROL

FIELD OF THE INVENTION

The present invention relates generally to the field of combustion turbines and more particularly to the field of ignition control systems for combustion turbines. Although the present invention may find particular utility in the field of gas turbine electric power plants, and will be described in relation to such equipment, the invention can also be applied to combustion turbines having other uses.

BACKGROUND OF THE INVENTION

Gas turbine electric power plants are utilized in so-called base load, mid-range load and peak load power system applications. Combined cycle plants are normally used for the base or mid-range applications while the power plant which utilizes a single gas turbine as the generator drive is highly useful for peak load applications because of its relatively low cost.

In the operation of gas turbines, particularly in electric power plants, various kinds of control systems have been employed from relay-pneumatic type systems, to analog type electronic controls, to digital controls, and more recently to computer based software controls. U.S. Pat. No. 4,308,463—Giras et al., assigned to the assignee of the present invention and incorporated herein by reference, lists several of such prior systems. That patent also discloses a digital computer based control system for use with gas turbine electric power plants. It can be said that the control system described in U.S. Pat. No. 4,308,463 is a predecessor to the system described in the present invention. It will be noted that the Giras et al. patent is one of a family of patents all of which are cross referenced therein.

Subsequent to the Giras et al. patent, other control systems have been introduced by Westinghouse Electric Corporation of Pittsburgh, Pa. under the designations POWERLOGIC and POWERLOGIC II. Similar to the Giras et al. patent these control systems are used to control gas tubrine electric power plants. However, such control systems are primarily micro-processor based computer systems, i.e. the control systems are implemented in software, whereas prior control systems were implemented in electrical and electronic hardware.

The operating phiolosophy behind the POWERLOGIC and POWERLOGIC II control system is that it shall be possible for the operator to bring the turbine generator from a so-called ready-start condition to full power by depressing a single button. All modes of turbine-generator operation are to be controlled including control of fuel flow furing large step changes in required power output.

The present invention constitutes an improvement to the POWERLOGIC II system. Ignition in prior combustion turbines, for example the W501D5, utilize compressor discharge pressure as a measure for determining when ignition should occur. Unfortunately, this so-called constant pressure ignition is effected by ambient conditions such as air temperature and the temperature of the metal parts of the turbine itself. It can be shown that ambient temperature can effect air flow through a combustion turbine by as much as 6 percent. The possibility exists that certain fuel/air conditions which are outside the ignition envelope of the combustion turbine could occur. Consequently, a need exists for more reliably determining when optimum conditions re present for the ignition process.

Although, the operation of a gas turbine electric power plant and the POWERLOGIC II control system are described generally herein, it should be noted that the invention is particularly concerned with enabling the ignition process in gas turbines.

SUMMARY OF THE INVENTION

It is an object of the present invention to provide an electric power plant having a combustion turbine driven generator and a controller for sensing optimum air flow and for enabling the ignition process when optimum airflow conditions are present.

It is another object of the present invention to provide a turbine control system which controls the enablement of the ignition process so that ignition occurs during optimum air flow conditions.

It is still another object of the present invention to generate an ignition enable control signal which is representative of turbine speed adjusted to account for ambient air temperature.

It is yet another object of the present invention to generate an ignition enable control signal which is representative of turbine speed adjusted to account for ambient air temperature wherein a bias factor is added to actual turbine speed.

These and other objects of the invention are achieved by method and apparatus for generating an ignition enabling signal for use with a given combustion turbine, wherein a turbine speed signal is given, and includes a sensor for generating an ambient air temperature signal, a reference member for generating a reference signal representative of the turbine speed at which optimum air flow exists for ignition, a comparator for comparing the reference signal to an adjusted speed signal and for generating the ignition enabling signal when the adjusted speed signal exceeds the reference signal. The adjusted speed signal is generated by modifying the turbine speed signal in response to the ambient air temperature signal. Such modification is achieved by summing the turbine speed signal with a bias speed factor. The bias speed factor is representative of the difference between optimum turbine ignition speed and that turbine speed necessary for optimum ignition air flow to exist in said combustion turbine at such ambient temperature.

These and other objects and advantages of the invention will become more apparent from the following detailed description when taken in conjunction with the following drawings.

BRIEF DESCRIPTION OF THE DRAWINGS

FIG. 1 shows a top plan view of a gas turbine power plant arranged to operate in accordance with the principles of the present invention;

FIGS. 2 and 3 show respective electrical systems useable in the operation of the gas turbine power plant of FIG. 1;

FIGS. 6–8 show a fuel nozzle and parts thereof employed in the gas turbine of FIG. 5;

DETAILED DESCRIPTION OF THE PREFERRED EMBODIMENT

Figure 13:
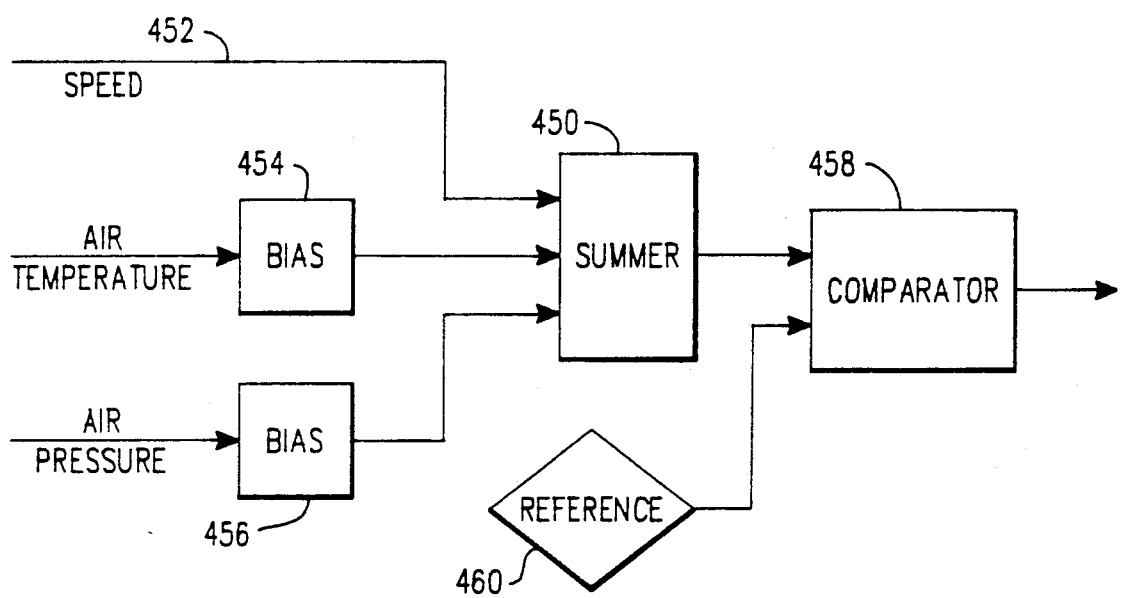
FIG. 13 shows a schematic diagram of the control circuit of the present invention for sensing optimum air flow and enabling the ignition process.

A new and novel system for controlling fuel flow in a combustion turbine-generator during load transients is described in relation to FIG. 13 herein, particularly for use in controlling fuel flow during large step changes in required power output. Although the present invention can be implemented in either software or hardware, in the preferred embodiment it is implemented in software contained in a central processing unit to be described herein. However, before describing the particular program of the present invention consider first an overall description of the operating environment for the invention, namely a gas turbine powered electric power plant.

There is shown in FIG. 1 a gas turbine electric power plant 100 which includes AC generator 102 driven by combustion or gas turbine 104. In the embodiment described herein, gas turbine 104 is preferably the W 501D5 type manufactured by Westinghouse Electric Corporation.

A typical use of power plant 100 is where continuous power generation is desired and the exhaust heat from gas turbine 104 is desired for a particular purpose such as feedwater heating, boiler, or economizers. In addition to the advantage of relatively low investment cost, power plant 100 can be located relatively close to load centers, i.e. population centers or manufacturing sites, as indicated by system requirements without the need for a cooling water supply thereby advantageously producing a savings in transmission facilities. Further, power plant 100 can be left relatively unattended and automatically operated from a remote location.

Community acceptance of power plant 100 is enhanced by the use of inlet and exhaust silencers 108 and 110 which are coupled respectively to inlet and exhaust ductworks 112 and 114. Fast startup and low standby costs are additional operating advantages characteristic to power plant 100.

Power plant 100 can be provided with an enclosure (not shown) in the form of a rigid frame-type sectional steel building. Buildings of this type typically comprise rigid structural steel frames covered by sectional type panels on the roof and walls. The roof and wall construction is designed for minimum heat loss and minimum noise penetration while enabling complete disassembly when required.

In order to gain an appreciation of the size of the power plant described herein, the foundation for plant 100 is approximately 106 feet long if a control station is provided for a single plant unit. The foundation length can be increased as indicated by the reference character 116 to provide for a master control station. A master control station would be warranted if additional plant units, grouped with plant 100, are to have common control. Although the present invention can be utilized in a master control setting for multiple power plants, for simplicity, the invention is described herein in relation to only a single turbine generator.

Micro-processor based computers and other control system circuitry in cabinet 118 provides for operation and control of power plant 100. In the preferred embodiment, cabinet 118 includes WDPF equipment sold by Westinghouse Electric Corporation and can include two distributed processing units, an engineers console and a logger. Such other control system circuitry would include appropriate input/output (I/O) circuitry necessary for interfacing the computer control systems with various operating equipment and condition sensors. An operator's cabinet 120, associated with the control cabinet 118, contains vibration monitor, electronics for UV flame detectors, a synchroscope, various push-button switches, an industrial computer and electromechanical counters and timers. An automatic send/receive printer 122 and a protective relay panel 124 for sensing abnormal electric power system conditions are associated with the control cabinet 118.

Startup or cranking power for the plant 100 is provided by a starting engine 126 which in the preferred embodiment is an AC motor unit. Starting engine 126 is mounted on an auxiliary bedplate and coupled to the drive shaft of gas turbine 104 through a starting gear unit 128. During the initial startup period, AC motor 128 operates through a turning gear 130 and starting gear 132 to drive the gas turbine. When turbine 104 reaches approximately 20 percent of rated speed, ignition takes place. AC motor 128 continues to operate until turbine 104 reaches sustaining speed. AC motor 128 can be operated for longer periods if turbine disc cavity temperature is excessive, in order to avoid thermally induced shaft bowing.

A motor control center 134 is also mounted on the auxiliary bedplate and it includes motor starters and other devices to provide for operation of the various auxiliary equipment items associated with the plant 100. Electrical breakers for motor control center 134 are preferably front mounted. Various signals from sensor or contact elements associated with motor control center 134 and with other devices mounted on the auxiliary bedplate are transmitted for use in the control system as considered more fully in connection with FIG. 11.

Figure 11:
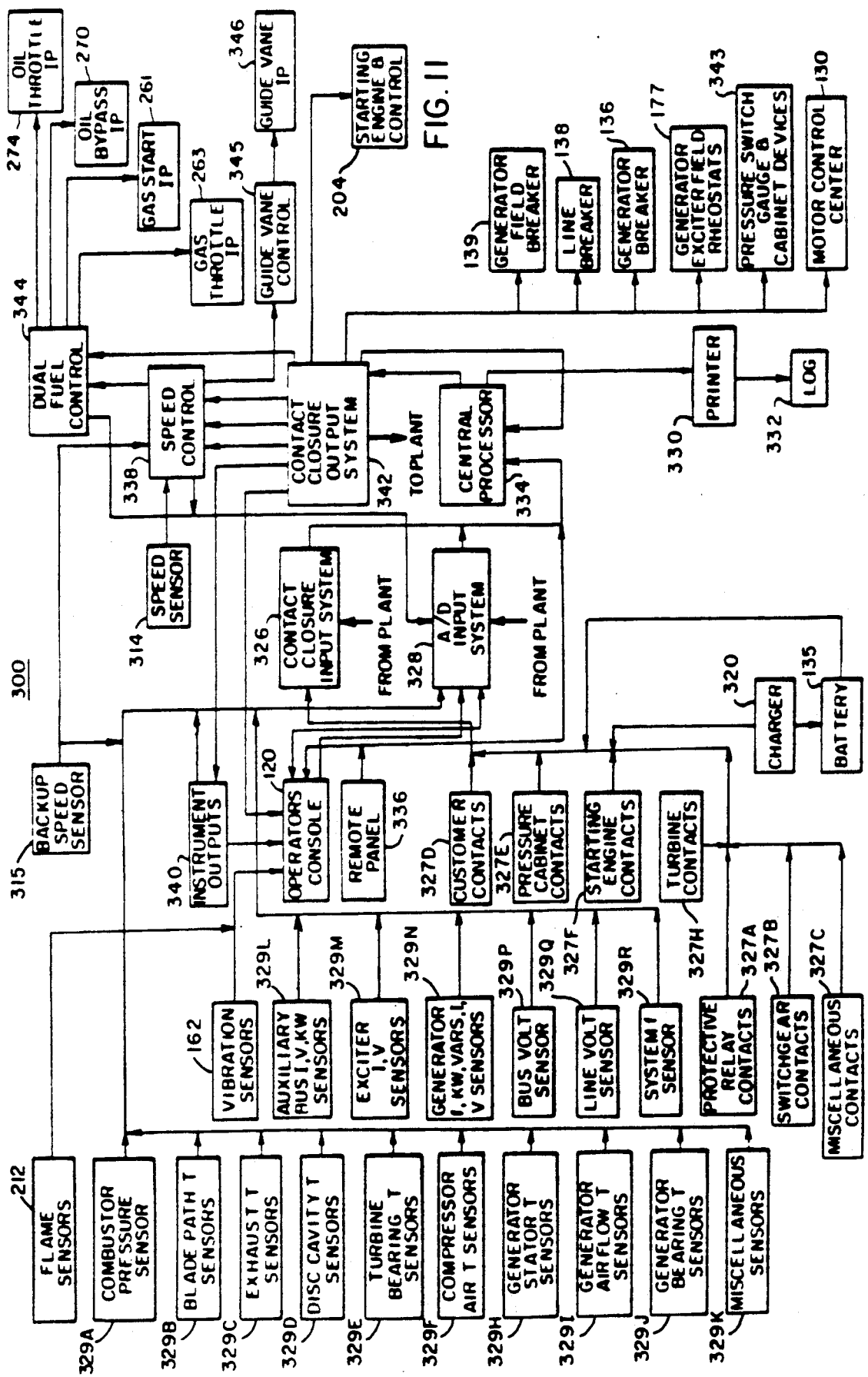
FIG. 11 shows a block diagram of a digital computer control system employed to operate the gab turbine power plant of FIG. 1.

A plant battery 135 is disposed adjacent to one end of the auxiliary bedplate or skid. A battery charger, described in relation to FIG. 11, is connected to the motor control center 134 through a breaker (not shown). Battery 135 can be any heavy duty control battery such as the EHGS-17 EXIDE rated at 125 volts, 60 cells. In any event, battery 135 should be capable of supplying adequate power for emergency lighting, auxiliary motor loads, AC computer supply voltages and other control power for one hour following shutdown of the plant 100.

One possible internal electrical power system for use with plant 100 is shown generally in FIG. 2. Once plant 100 is in operation, power generated by generator 102 is transmitted to the power system through generator breaker 136, through 13.8 KV bus 137 to a main transformer (not shown) and line breaker 138. Auxiliary power for the plant 100 is obtained from the internal power system through an auxiliary breaker 139 and an auxiliary power 480 volt bus 140. The generator breaker 136 serves as a and protective disconnect device for the plant 100.

If a suitable 480 volt source is not available in the internal power system, an auxiliary power transformer 141 can be provided as shown in FIG. 3. A disconnect switch 142 is connected between transformer 141 and the station 13.8 KV bus 137. The arrangement as shown in FIG. 3 can provide for so-called black plant startup operation. With this arrangement, gas turbine 104 may be started at any time, since the auxiliaries may be supplied from either generator 102 or the internal power system, whichever is energized. In a black start, i.e. a dead system, gas turbine 104 may be started at any time for availability as a so-called spinning standby power source, even though the external power system, to which plant 100 is connected, is not ready to accept power from generator 102. Further, the circuits shown in FIGS. 2 and 3 allow plant 100 to be separated from an external power system in trouble without shutting down gas turbine 104. The breaker nearest the power system load would be tripped to drop the load and let generator 102 continue to run and supply its own auxiliaries.

An additional advantage of the scheme shown in FIG. 3 is the protection provided if the connection to the power system is vulnerable to a permanent fault between plant 100 and the next breaker in the system. In such a situation line breaker 138 would be the clearing breaker in case of such a fault and the auxiliary system would remain energized by generator 102 which would allow an orderly shutdown of the gas turbine 104 or continued operation as standby.

The arrangement of FIG. 3 is preferable if gas turbine 104 is programmed to start during a system low voltage or decaying frequency situation. During such events, automatic startup could bring turbine 104 up to speed, close generator breaker 136 and supply power to the auxiliary load. The turbine-generator unit would then be running and would be immediately available when desired. The arrangement of FIG. 3 can also be utilized if an under-frequency or under-voltage signal is to be used to separate the gas turbine 104 from the system.

A switchgear pad 143 is included for 15 KV switchgear 144, 145 and 146, including generator breaker 136. The auxiliary power transformer 141 and disconnect switch 142 are also disposed on switchgear pad 143 if they are selected for use by the user. Excitation switchgear 150 associated with the generator excitation system is also included on the switchgear pad 143. As will be described in greater detail hereinafter, the I/O circuitry of cabinet 118 accepts signals from certain sensor or contact elements associated with various switchgear pad devices.

A pressure switch and gauge cabinet 152 is also included on the auxiliary bedplate. Cabinet 152 contains the pressure switches, gauges, regulators and other miscellaneous elements needed for gas turbine operation.

Although not specifically shown, it should be understood that plant 100 also incorporates a turbine high pressure cooling system and a radiation-type air-to-oil cooler for lubrication oil cooling. Such devices can be of any known design.

Figure 4:
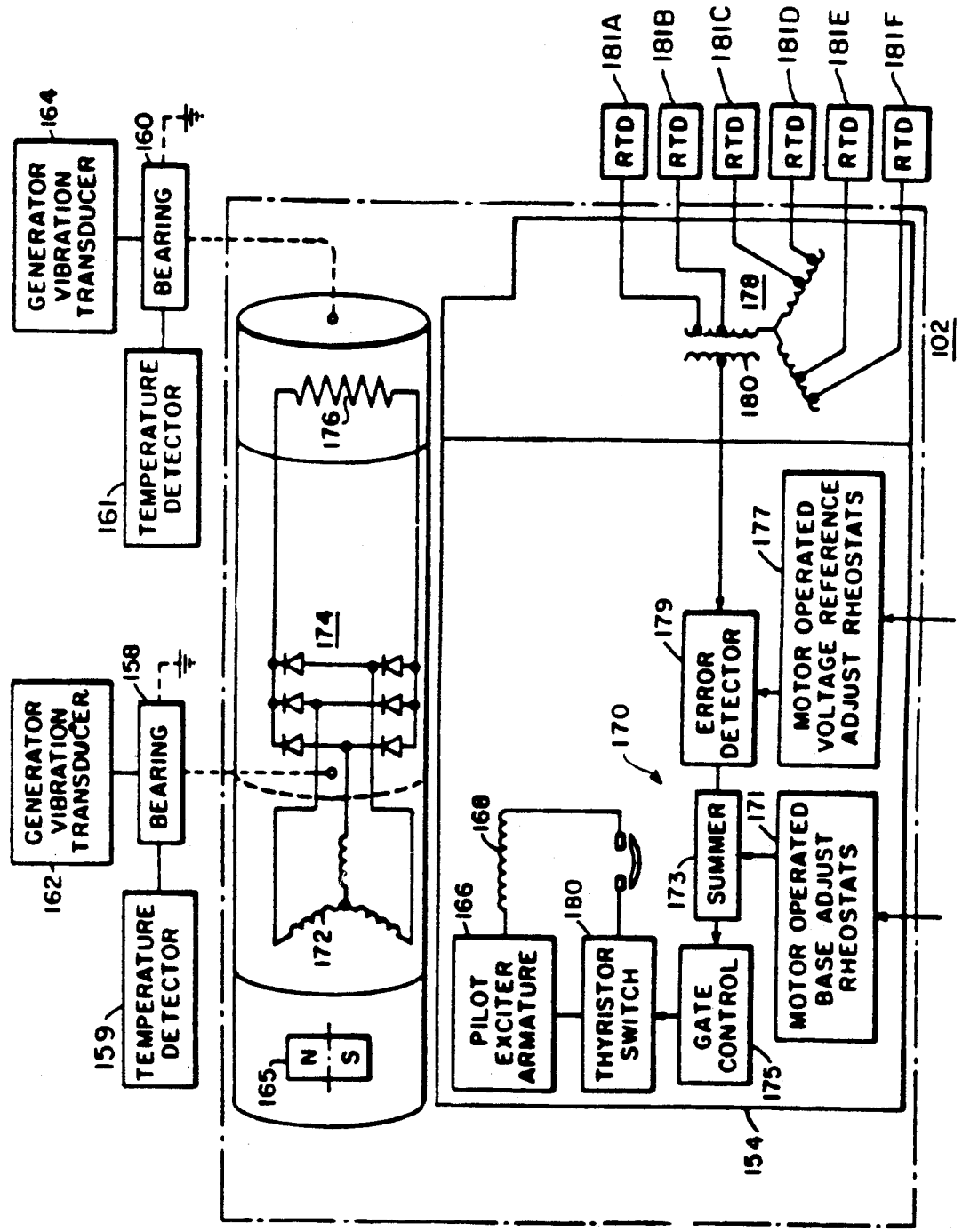
FIG. 4 shows a schematic view of a rotating rectifier exciter and a generator employed in the gas turbine power plant of FIG. 1.

Generator 102, including brushless exciter 154, is schematically illustrated in greater detail in FIG. 4. The rotating elements of generator 102 and exciter 154 are supported by a pair of bearings 158 and 160. Conventional generator vibration transducers 162 and 164 are coupled to bearings 158 and 160 for the purpose of generating input data for the plant control system. A grounding distribution transformer with secondary resistors (not shown) is provided to ground the generator neutral.

Resistance temperature detectors (RTD) 181 A-F, embedded in the stator winding, are installed to measure the air inlet and discharge temperatures and the bearing oil drain temperatures as indicated in FIG. 4. Signals from the temperature sensors and vibration transducers 162 and 164 are transmitted to the control system, i.e. cabinet 118.

In the operation of the exciter 154, a permanent magnet field member 165 is rotated to induce voltage in a pilot exciter armature 166 which is coupled to a stationary AC exciter field 168 through a voltage regulator (not shown). Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker 136 when the plant 100 is synchronized and on the line. A transformer 180 supplies a feedback signal for the regulator 170 to control the excitation level of the exciter field 168. The signal from transformer 180 is also used as the generator megawatt signal, a control signal supplied to cabinet 118.

Generally, exciter 154 operates without the use of brushes, slip rings, and external connections to the generator field. Brush wear, carbon dust, brush maintenance requirements and brush replacement are thereby eliminated.

All power required to excite generator field 176 is delivered from the exciter-generator shaft. The only external electrical connection is between the stationary AC exciter field 168 and the excitation switchgear 150 (FIG. 1).

In the preferred embodiment, all of the exciter parts are supported by generator 102. The generator rotor can be installed and withdrawn without requiring removal of the exciter rotor from the generator shaft.

The brushless excitation system regulator 170 responds to average three phase voltage with frequency insensitivity in determining the excitation level of the brushless exciter field 168. If the regulator 170 is disconnected, a motor operated base adjust rheostat 171 is set by a computer output signal from cabinet 118. The rheostat output is applied through a summing circuit 173 to a thyristor gate control 175. If the regulator 170 is functioning, the base adjust rheostat is left in a preset base excitation position, and a motor operated voltage reference adjust rheostat 177 is computer adjusted to provide fine generator voltage control.

An error detector 179 applies an error output signal to summing circuit 173, which error output signal is representative of the difference between the computer output reference applied to voltage reference rheostats 177 and the generator voltage feedback signal from transformer 180. The summing circuit 173 adds the error signal and the base rheostat signal in generating the output which is coupled to the gate control 175. In error detector 179, the reference voltage is held substantially constant by the use of a temperature compensating Zener diode. In gate control 175, solid state thyristor firing circuitry is employed to produce a gating pulse which is variable from 0° to 180° with respect to the voltage supplied to thyristors or silicon controlled rectifiers 180.

The silicon controlled rectifiers 180 are connected in an invertor bridge configuration (not shown) which provides both positive and negative voltage for forcing the exciter field. However, the exciter field current cannot reverse. Accordingly, the regulator 170 controls the excitation level in exciter field 168 and in turn the generator voltage by controlling the cycle angle at which the silicon controlled rectifiers 180 are made conductive in each cycle as level of the output from the gate control 175.

Figure 5:
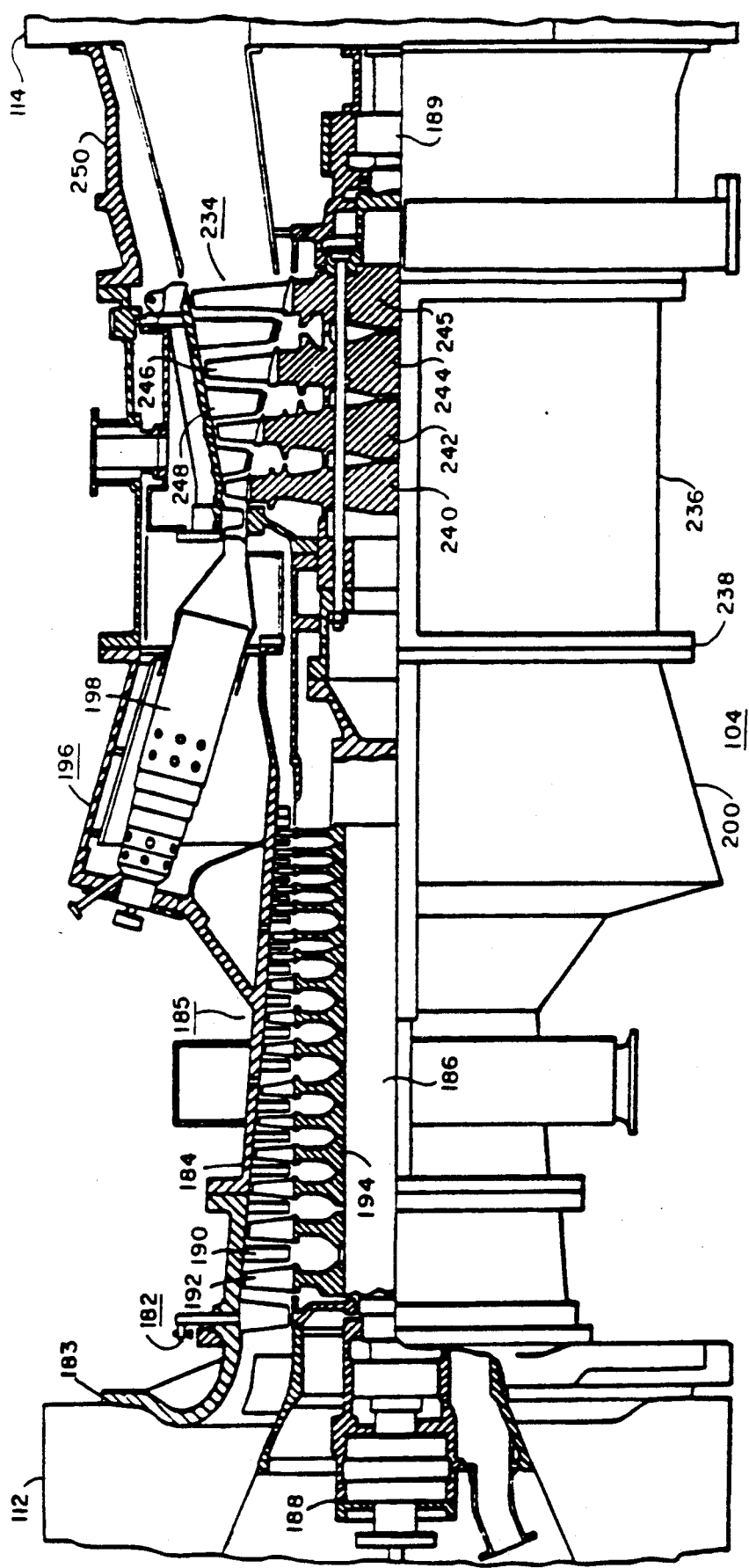
FIG. 5 shows a front elevational view of an industrial gas turbine employed in the power plant of FIG. 1.

Referring now to FIG. 5, gas turbine 104 in the preferred embodiment is the W 501D5, a simple cycle type having a rated speed of 3600 rpm. As will be apparent from the drawings, turbine 104 includes a two bearing single shaft construction, cold-end power drive and axial exhaust. Filtered inlet air enters multistage axial flow compressor 185 through flanged inlet manifold 183 from inlet ductwork 112. An inlet guide vane assembly 182 includes vanes supported across the compressor inlet to provide for surge prevention particularly during startup. The angle at which all of the guide vanes are disposed in relation to the gas stream is uniform and controlled by a pneumatically operated positioning ring (not shown) coupled to the vanes in the inlet guide vane assembly 182.

The compressor 185 is provided with a casing 184 which is split into base and cover halves along a horizontal plane. The turbine casing structure including the compressor casing 184 provides support for a turbine rotating element, i.e. turbine shaft, through bearings 188 and 189. Vibration transducers (FIG. 11) similar to those described in connection with FIG. 4 are provided for the gas turbine bearings 188 and 189. Compressor rotor structure 186 is secured to the turbine shaft in any known manner.

The compressor casing 184 also supports stationary blades 190 in successive stationary blade rows along the air flow path. Further, casing 184 operates as a pressure vessel to contain the air flow as it undergoes compression. Bleed flow is obtained under valve control from intermediate compressor stages according to known techniques to prevent surge during startup.

The compressor inlet air flows annularly through stages in compressor 185. Blades 192 mounted on the rotor 186 by means of discs 194 are appropriately designed from an aerodynamic and structural standpoint for the intended service. Both the compressor inlet and outlet air temperatures are measured by suitably supported thermocouples (FIG. 11).

Consider now the combustion system. Pressurized compressor outlet air is directed into a combustion system 196 comprising a total of sixteen can-annular combustors 198 conically mounted within a section 200 of the casing 184 about the longitudinal axis of the gas turbine 104. Combustor shell pressure is detected by a suitable sensor (FIG. 11) coupled to the compressor-combustor flow paths and provides a signal to cabinet 118 and pressure switch and gauge cabinet 152.

Combustors 198 are shown to be cross-connected by cross-flame tubes 202 for ignition purposes in FIG. 6. A computer enabled sequenced ignition system 204 includes igniters 206 and 208 associated with respective groups of four combustors 198. In each group, the combustors 198 are series cross-connected and the two groups are cross-connected at one end only as indicated by the reference character 210. The computer generated enabling signal will be described later. Generally, ignition system 204 includes a capacitance discharge ignitor and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet (UV) flame detectors 212 and 214 are associated with each of the end combustors in the respective groups in order to verify ignition and continued presence of combustion in the fourteen combustor baskets 198. Redundancy in flame sensing capability is especially desirable because of the hot flame detector environment.

Generally, the UV flame detector responds to ultraviolet radiation at wavelengths within the range of 1900–2900 Angstroms which are produced in varying amounts by ordinary combustor flames but not in significant amounts by other elements of the combustor basket environment. Detector pulses are generated, integrated and amplified to operate a flame relay when a flame is present. Ultraviolet radiation produces gas voltage breakdown which causes a pulse train. The flame monitor adds time delay before operating a flame relay if the pulse train exceeds the time delay.

In FIG. 7, there is shown a front plan view of a dual fuel nozzle 216 mounted at the compressor end of each combustor 198. An oil nozzle 218 is located at the center of the dual nozzle 216 and an atomizing air nozzle 220 is located circumferentially thereabout. An outer gas nozzle 222 is disposed about the atomizing air nozzle 220 to complete the assembly of the fuel nozzle 216. It should be noted that only the main fuel nozzles for the W 501F turbine have been shown. This turbine also includes a pilot system which is not shown.

As indicated in the section view of FIG. 8, fuel oil or other liquid fuel enters the oil nozzle 218 through conduit 224 while atomizing air enters manifolded 226 through bore 228. Gaseous fuel is emitted through the nozzle 222 after flow through entry pipe 230 and manifolded/multiple nozzle arrangement 232. The regulation of fuel flow through conduits 224 and 230 will be described later.

Generally, either liquid or gaseous fuel or both liquid and gaseous fuel can be used in the turbine combustion process. Various gaseous fuels can be burned including gases ranging from blast furnace gas having low BTU content to gases with high BTU content such as natural gas, butane or propane. However, today's strict environmental regulations limit the fuel considered to natural gas, #2 distillate, and coal derived low BTU gas produced in an integrated gasification combined cycle power plant.

To prevent condensable liquids in the fuel gas from reaching nozzles 216, suitable traps and heaters can be employed in the fuel supply line. The maximum value of dust content is set at 0.01 grains per standard cubic foot to prevent excess deposit and erosion. Further corrosion is minimized by limiting the fuel gas sulphur content in the form of $H_2S$ to a value no greater than 5% (mole percent).

With respect to liquid fuels, the fuel viscosity must be less than 100 SSU at the nozzle to assure proper atomization. Most distillates meet this requirement. However, most crude oils and residual fuels will require additive treatment to meet chemical specifications even if the viscosity specification is met. To prevent excess blade deposition, liquid fuel ash content is limited to maximum values of corrosive constituents including vanadium, sodium, calcium and sulphur.

A portion of the compressor outlet air flow combines with the fuel in each combustor 198 to produce combustion after ignition and the balance of the compressor outlet air flow combines with the combustion products for flow through combustors 198 into a multistage reaction type turbine 234 (FIG. 5). The combustor casing section 200 is coupled to a turbine casing 236 through a vertical casing joint 238. No high pressure air or oil seal is required between the compressor 185 and the turbine 234.

Consider now the torque producing portion of turbine 104 shown in FIG. 5. The torque or turbine portion 234 is provided with four reaction stages through which the multiple stream combustion system gas flow is directed in an annular flow pattern to transform the kinetic energy of the heated, pressurized gas into turbine rotation to drive the compressor 185 and the generator 102. The turbine rotor is formed by four disc blade assemblies 240, 242, 244 and 245 mounted on a stub shaft by through bolts. Temperature sensing thermocouples (FIG. 11) are supported within the disc cavities to provide cavity temperature signals for the control system. High temperature alloy rotor blades 246 are mounted on the discs in forming the rotor assembly. Individual blade roots are cooled by air extracted from the outlet of the compressor 185 and passed through a coolant system in any suitable manner. The blade roots thus serve as a heat sink for the rotating blades 246. Cooling air also flows over each of the turbine discs to provide a relatively constant low metal temperature over the unit operating load range.

The two support bearings 188 and 189 for turbine rotating structure are preferably so-called tilting pad bearings. The bearing housings are external to the casing structure to provide for convenient accessibility through the inlet and exhaust ends of the structure. The overall turbine support structure provides for free expansion and contraction without disturbance to shaft alignment.

In addition to acting as a pressure containment vessel for the turbine 234, the turbine casing 236 supports stationary blades 248 which form stationary blade rows interspersed with the rotor blade rows. Gas flow is discharged from the turbine 234 substantially at atmospheric pressure through a flanged exhaust manifold 250 attached to the outlet ductwork 114.

The generator and gas turbine vibration transducers (FIG. 11) can be conventional velocity transducers, such as the which transmit basic vibration signals to a vibration monitor for input to the control system, for example, the Bently-Nevada vibration monitor system. A pair of conventional speed detectors (FIGS. 12) are supported at appropriate turbine-generator shaft locations. Signals generated by the speed detectors are employed in the control system in determining power plant operation.

A number of thermocouples are associated with the gas turbine bearing oil drains. Further, thermocouples for the blade flow path are supported about the inner periphery of the exhaust manifold 250 in any known manner to provide a fast response indication of blade temperature for control system usage particularly during plant startup periods. Exhaust temperature detectors are disposed in the exhaust ductwork 114 primarily for the purpose of determining average exhaust temperature for control system usage during load operations of the power plan 100. Suitable high response shielded thermocouples for the gas turbine 104 are those which use compacted alumina insulation with a thin-wall high alloy swaged sheath or well supported by a separate heavy wall guide. The significance of the above described thermocouples and other temperature detectors will be described in relation to FIG. 11.

Figure 9:
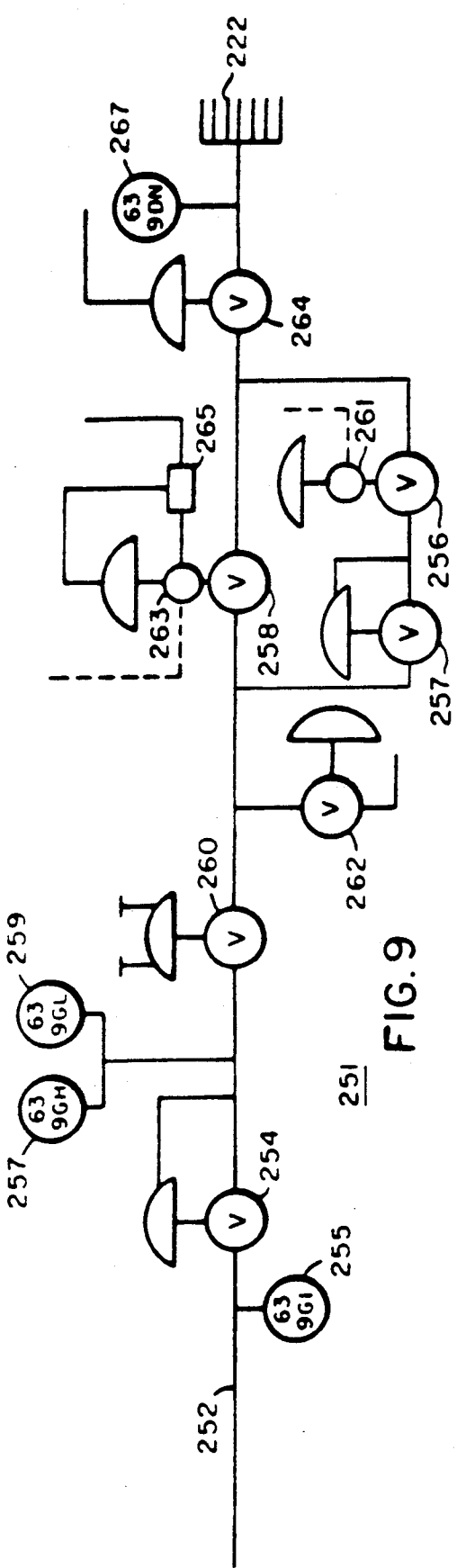
FIGS. 9 and 10 respectively show schematic diagrams of gas and liquid fuel supply systems employed with the gas turbine of FIG. 5.

Consider now the fuel system of turbine 104. Referring to FIG. 9, a fuel system 251 is provided for the delivery of gaseous fuel to the gas nozzles 222 under controlled fuel valve operation. Gas is transmitted to a diaphragm operated pressure regulating valve 254 from a gas source. It is noted at this point in the description that IEEE switchgear device numbers are generally used herein where appropriate as incorporated in American Standard C37.2-1956.

A starting valve 256 determines gas fuel flow to the nozzles 222 at turbine speeds up to 3600 RPM. Valve 256 is pneumatically positioned by pneumatic actuator 261 in response to a computer generated control signal. For ignition, valve 256 is partially open when pneumatic actuator 261 is in its fully closed position. Pressure regulating valve 257 provides a constant pressure and thus at ignition a constant gas flow for repeatable gas ignition in the combustion baskets.

As the maximum flow range of the valves 257 and 256 is reached, valve 258 opens to control gas flow to the combustion turbines maximum load output.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere from trip valve 260 as does on/off pneumatically operated isolation valve 264. Valves 262 and 264 are normally both closed. The isolation valve fuel control action is initiated by an electronic control signal applied through the pressure switch and gauge cabinet 152 (FIG. 1 and FIG. 11).

Figure 10:
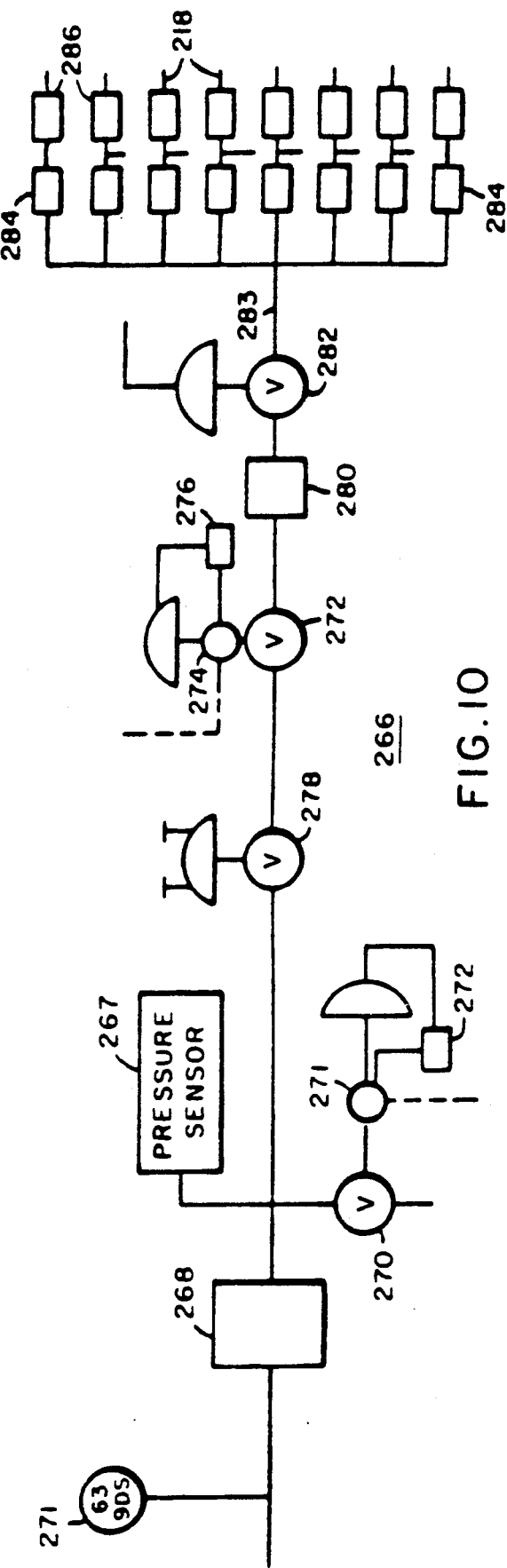

Referring now to FIG. 10, a liquid fuel supply system 266 provides for liquid fuel flow to fourteen nozzles 218 (only eight are shown) from any suitable fuel source by means of the pumping action of motor driven main fuel pump 268. Pump discharge pressure is sensed for control system use by a detector 267. A bypass valve 271 is pneumatically operated by an electropneumatic converter 270 and a booster relay 272 to determine liquid fuel bypass flow to a return line and thereby regulate liquid fuel discharge pressure. A computer generated control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 271 indicates whether the pump 268 has pressurized intake flow.

After pressure ramping, the pneumatically operated throttle valve 272 is positioned to control liquid fuel flow to the nozzles 218 as determined by a pneumatic actuator 274 and a booster relay 276. A computer generated control signal determines the converter position control action for the throttle valve 272. During such operation, bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valve 282 provides on/off control of liquid fuel flow to a liquid manifold 283.

Fourteen (only eight are shown) positive displacement pumps 284 are respectively disposed in the individual liquid fuel flow paths to nozzles 218. Pumps 284 are mounted on a single shaft and they ar driven by the oil flow from the manifold 283 to produce substantially equal nozzle fuel flows. Check valves 286 prevent back flow from the nozzles 218.

Consider now the control system utilized in controlling plant 100. Power plant 100 is operated under the control of an integrated turbine-generator computer based control system 300 which is schematically illustrated in FIG. 11. The plant control system 300 embraces elements disposed in the control cabinet 118, the pressure switch and gauge cabinet 152 and other elements included in the electric power plant 100 of FIG. 1. If multiple plants are to be operated, the control system 300 further embodies any additional circuitry needed for the additional plant operations.

The control system 300 is characterized with centralized system packaging. Thus, the control cabinet 118 shown in FIG. 1 houses an entire speed/load control package, an automatic plant sequence package, and a systems monitoring package.

As a further benefit to the plant operator, turbine and generator operating functions are in the preferred embodiment included on a single operator's panel in conformity with the integrated turbine-generator plant control provided by the control system 300.

The control system 300 provides automatically, reliably and efficiently sequenced start-stop plant operation, monitoring and alarm functions for plant protection and accurately, reliably and efficient performing speed/load control during plant startup, running operation and shutdown. The plant operator can selectively advance the turbine start cycle through discrete steps by manual operation.

Under automatic control power plant 100 can be operated under local operator control or it can be unattended and operated by remote supervisory control. Further, the plant 100 is started from rest, accelerated under accurate and efficient control to synchronous speed preferably in a normal fixed time period to achieve in the general case extended time between turbine repairs, synchronized manually or automatically with the power system and loaded under preferred ramp control to a pre-selectable constant or temperature limit controlled load level thereby providing better power plant management.

In order to start plant 100, control system 300 first requires certain status information generated by operator switches, temperature measurements, pressure switches and other sensor devices. Once it is determined that the overall plant status is satisfactory, the plant startup is initiated under programmed computer control. Plant devices are started in parallel whenever possible to increase plant availability for power generation purposes. Under program control, completion of one sequence step generally initiates the next sequence step unless a shutdown alarm occurs. Plant availability is further advanced by startup sequencing which provides for multiple ignition attempts in the event of ignition failure.

The starting sequence generally embraces starting and operating the starting engine to accelerate the gas turbine 104 from low speed, stopping the turning gear, igniting the fuel in the combustion system at about 20% rated speed, accelerating the gas turbine to about 60% rated speed and stopping the starting engine, accelerating the gas turbine 104 to synchronous speed, and loading the power after generator breaker 136 closure. During shutdown, fuel flow is stopped and the gas turbine 104 undergoes a deceleration coastdown. The turning gear is started to drive the turbine rotating element during the cooling off period.

Figure 12:
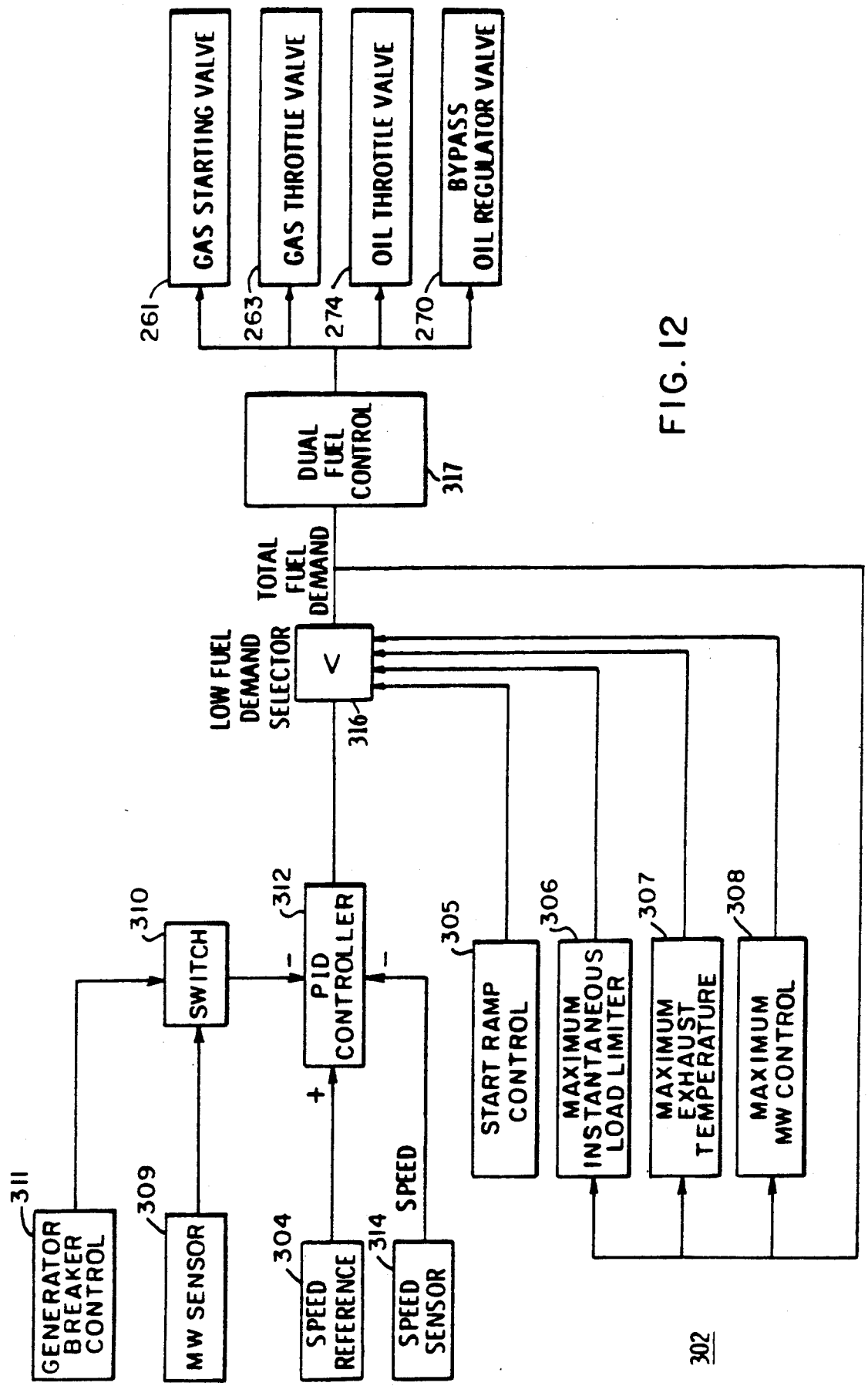
FIG. 12 shows a schematic diagram of a control loop which may be employed in operating the computer control system of FIG. 11.

A control loop arrangement 302 shown in FIG. 12 provides a representation of the preferred general control looping embodied in control system 300 (FIG. 11) and applicable in a wide variety of other applications of the invention. Protection, sequencing, more detailed control functioning and other aspects of the control system operation are subsequently considered more fully herein. In the drawings, SAMA standard function symbols are employed.

The control loop arrangement 302 comprises an arrangement of blocks of process control loops for use in operating the gas turbine power plant 100. No delineation is made in FIG. 12 between hardware and software elements since many aspects of the control philosophy can be implemented in hard or soft form.

Generally, a feedforward characterization is preferably used to determine a representation of fuel demand needed to satisfy speed requirements. Measured process variables including turbine speed, ambient temperature and pressure, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a start ramp limit fuel demand and a maximum exhaust temperature limit fuel demand are preferably nonlinear in accordance with the nonlinear characteristics of the gas turbine to achieve more accurate, efficient, available and reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves, 256, 258 and 272. Further, the control arrangement 302 can provide for simultaneous burning of gas and liquid fuel and it can provide for automatic bumpless transfer from one fuel to the other when required. The subject of bumpless plant transfer between different fuels and the plant operation associated therewith is known and has been disclosed in U.S. Pat. No. 3,919,623, incorporated herein by reference.

In the combination of plural control loop functions shown in FIG. 12, a low fuel demand selector 316 is employed to limit fuel demand by selecting from various fuel limit representations generated by each control loop. These limit representations are generated respectively by speed control 303, start ramp control 305, maximum exhaust temperature control 306, maximum megawatt control 307 and maximum instantaneous load pickup limiter 308.

During startup and after ignition, start ramp control 305 provides an open loop fuel demand to accelerate turbine 104 to approximately 80% rated speed. From 80% speed up to and through synchronization, speed control 303 controls turbine 104 to maintain a constant acceleration and desired speed during synchronization.

After synchronization of generator 102, turbine speed is regulated by the power system frequency if the power system is large. Consequently, after synchronization speed control 303 regulates fuel flow by ramping the speed reference signal, generated at 304 by any known technique, in order to cause a ramping of the megawatt output of generator 102.

In the preferred embodiment, speed control 303 includes proportional, integral, differential (PID) controller 312. A megawatt feedback signal representative of the megawatt output of generator 102 is generated at 309 by any known technique and is provided to switch 310. Switch 310 provides the megawatt feedback signal to a negative input of controller 312 whenever generator breaker control 311 indicates that the generator breaker has been closed. A signal representative of turbine speed is generated by speed sensor 314, by any known technique, and is provided to another negative input of controller 312. The speed reference signal is provided to the positive input of controller 312.

Since controller 312 will require its inputs to sum zero and since the speed signal from sensor 314 is essentially constant at synchronization, the speed reference signal will be balanced by the megawatt signal such that the output of controller 312 will be representative of a ramping of the speed reference signal to pick up load.

As the turbine load, i.e. generator megawatt output, is increased, control loops 305, 306, 307 and 308 can take control of fuel flow through low fuel demand select 316 if any of the maximum limit conditions are exceeded. This will indeed happen as the exhaust temperature increases with increasing megawatt output. The maximum exhaust temperature control 307 will eventually control fuel flow to turbine 104 to the maximum allowed temperature.

At low ambient temperatures, maximum megawatt control 308 will become low selected before maximum temperature control 307 becomes effective.

At the output of the low fuel demand selector 316, the fuel demand representation is applied to a dual fuel control where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

The control arrangement 302 generally protects gas turbine apparatus against factors including too high loading rates, too high speed excursions during load transients, too high speed at generator breaker close, too high fuel flow which may result in overload too low fuel flow which may result in combustor system outfires during all defined modes of operation, compressor surge, and excessive turbine inlet exhaust and blade over-temperature. Further, the control arrangement 302 as embodied in the control system 300 meets all requirements set forth in the NEMA publication "Gas Turbine Governors", SM32-1960 relative to system stability and transient response and adjustment capability.

Consider now the control system 300 shown in block diagram detail in FIG. 11. It includes a general purpose computer system comprising a central processor 304 and associated input/output interfacing equipment.

More specifically, the interfacing equipment for the computer 304 includes a contact closure input system 306 which scans contact or other similar signals representing the status of various plant and equipment conditions. The status contacts might typically be contacts of mercury wetted relays (not shown) which are operated by energization circuits (not shown) capable of sensing the predetermined conditions associated with the various plant devices. Status contact data is used for example in interlock logic functioning in control and sequence programs, protection and alarm system functioning, and programmed monitoring and logging.

Input interfacing is also provided for the computer 304 by a conventional analog input system 328 which samples analog signals from the gas turbine power plant 100 at a predetermined rate for each analog channel input and converts the signal samples to digital values for computer processing. A conventional printer 330 is also included and it is used for purposed including for example logging printouts as indicated by the reference character 332.

Output interfacing generally is provided for the computer by means of a conventional contact closure output system 326. Analog outputs are transmitted through the contact closure output system 326 under program control.

The plant battery 135 considered previously in connection with FIG. 1 is also illustrated since it provides necessary supply voltages for operating the computer system, control system and other elements in the power plant 100. Battery charging is provided by a suitable charger 320.

Connections are made to the contact closure input system 326 from various turbine, protective relay, switchgear, pressure switch and gauge cabinet, and starting engine contacts. In addition certain customer selected contacts 327D and miscellaneous contacts 327C such as those in the motor control center 134 are coupled to the contact closure input system 326.

Analog/digital (A/D) input system 328 has applied to it the outputs from various plant process sensors or detectors, many of which have already been briefly considered. Various analog signals are generated by sensors associated with the gas turbine 104 for input to the computer system 334 where they are processed for various purposes. The turbine sensors 329 A-K include multiple blade path thermocouples, disc cavity thermocouples, exhaust manifold thermocouples, bearing thermocouples, compressor inlet and discharge thermocouples, and, as designated by the block marked miscellaneous sensors, oil reservoir thermocouple, bearing oil thermocouple, a main fuel inlet thermocouple, ambient air temperature sensor and an ambient air pressure sensor.

The signals generated by the ambient air temperature apparent in relation to the control circuit shown in FIG. 13. The sensor used to measure ambient temperature can be any known device such as a thermocouple. Ambient air temperature and ambient air pressure are preferably measured at the compressor inlet.

A combustor shell pressure sensor and a main speed sensor and a backup speed sensor also have their output signals coupled to the analog input system 328. A turbine support metal thermocouple is included in the miscellaneous block 329K.

Sensors 329 L-R associated with the generator 102 and the plant switchgear are also coupled to the computer 334. The generator temperature sensors include stator resistance temperature detectors, an inlet air thermocouple, an outlet air thermocouple, and bearing drain thermocouples. Vibration sensors associated with the generator 102 and the gas turbine 104 are coupled with the analog input system 328 through the operator's console 120 where the rotating equipment vibration can be monitored. As indicated by FIG. 11, additional sensors which are located in the protective relay cabinet generate signals representative of various bus, line, generator and exciter electrical conditions.

Other devices operated by contact closure outputs include the generator field breaker and the generator and line breakers 136, 138 and 139. The motor operated generator exciter field rheostats 171 and 177 and various devices in the motor control center 134 and the pressure switch and gauge cabinet 152 also function in response to contact closure outputs. The printer 330 is operated directly in a special input/output channel to central processor 334.

The ignition air flow controller is more particularly disclosed in FIG. 13. It will be recalled that the ignition air flow controller detects optimum air flow for ignition of turbine 104. The chances for ignition in large combustion turbines can be maximized if both fuel and air flow are maintained consistent with stability and/or flammability limits for a particular basket and nozzle configuration. Such limits should be below levels which would cause thermal damage to the turbine sections.

Generally, it is impractical to measure air flow through the turbine directly because the presence of a flow meter or flow sensor would cause unacceptable performance penalties. Additionally, ignition air flow has a significantly smaller magnitude when compared to full output conditions. Consequently, ignition air flow would be difficult to measure accurately utilizing known delta pressure methods. Although so-called hot wires and anemometers could be utilized, their accuracy and reliability are suspect.

The goal in turbine ignition is to begin the ignition process when air flow is at an optimum. During operation, starting motor 126 slowly increases the speed of the turbine and thus air flow. If there were no external factors influencing air flow through the turbine, one could simply sense turbine speed and, as was done in prior turbines, begin the ignition process when turbine speed reached a preselected value. However, ambient air temperature and pressure can effect the amount of air flow through a turbine at a given speed. For example a turbine spinning at 3600 RPM on an 80° day could have identical air flow as that same turbine on a 59° F. day operating at 3400 RPM. The present invention accounts for this "effective turbine speed" condition and initiates the ignition process when the effective turbine speed reaches a preset reference speed level. The output of the air flow controller is utilized to enable ignition system 204.

In the control circuit shown in the FIG. 13, speed, ambient temperature, and, in the preferred embodiment, ambient pressure are measured. The combination of these measurements, after appropriate biasing, are compared with a known ignition set point speed. It should be noted that the ignition set point is representative of that turbine speed where optimum ignition air flow will occur. For example on a day when ambient temperature is 59° F. and ambient pressure is 29.92 inches mercury the ignition set point would be 720 RPM. In the present invention, when the adjusted speed signal reaches the ignition set point speed, optimum ignition conditions are present and the controller will generate an ignition enabling signal.

As shown in FIG. 13, a summer 450 is utilized to combine signals representative of turbine speed, ambient temperature and ambient pressure. The turbine speed signal is provided at 452, having been generated by the speed sensor shown in FIG. 11. Ambient temperature having been measured by any known method at the compressor inlet is provided to bias block 454. In response to the ambient temperature signal, biased block 454 generates a temperature based speed bias signal for appropriate combination with the turbine speed signal in summer 450. The ambient pressure signal, having been measured and generated in any known fashion, is provided to biased block 456. Similar to biased block 454, biased block 456 generates a pressure based speed bias signal to be combined with the turbine speed signal in summer 450.

As will be apparent from the above, the effect of processing the ambient temperature and pressure signals in bias blocks 454 and 456 is to generate a turbine speed compensation factor or bias signal which when added to the actual speed signal results in ignition occurring at that turbine speed wherein optimum air flow conditions exist. For example, in the W 501F turbine of the preferred embodiment, ignition will occur at approximately 20 percent rated speed or 720 RPM.

The speed bias signals are generated in relation to air flow characteristic curves for a given turbine relating to ambient air temperature and pressure. In the preferred embodiment, for example, such air flow characteristics indicate that as ambient air temperature varies above and below 59° F. turbine air flow can vary by as much as 13 percent. Consequently, in order to assure that ignition occurs at optimum air flow conditions, the controller of the present invention adjusts the actual turbine speed signal so that the reference speed provided by signal generator 460 is not reached until actual turbine speed is sufficient to provide optimum air flow. Since the type of turbine is known and since air flow characteristics for such turbine are also known, bias blocks 454 and 456 can be arranged in a so-called lookup table format.

The output of summer 450 is provided to comparator 458. Comparator 458 compares the summed signal with the turbine speed set point signal generated by reference block 460. As indicated previously, when the modified speed signal from summer 450 reaches the speed reference signal, comparator 458 provides an enabling signal to start the ignition process. At all other times when the adjusted actual turbine speed is less than the speed set point, the output of comparator 458 serves to prevent the enablement of the ignition process.

While the invention has been described and illustrated with reference to specific embodiments, those skilled in the art will recognize that modification and variations may be made without departing from the principles of the invention as described herein above and set forth in the following claims.

What is claimed is:

1. Apparatus for generating an ignition enabling signal for use with a given combustion turbine, wherein a turbine speed signal is given and wherein said combustion turbine includes ignition means for igniting said turbine in response to an ignition enabling signal, said apparatus comprising, sensor means for sensing the temperature of ambient air and for generating an ambient air temperature signal;

reference means for generating a reference signal representative of the turbine speed at which optimum air flow exists for ignition of said combustion turbine;

comparator means for comparing said reference signal to an adjusted speed signal, for generating said ignition enabling signal when said adjusted speed signal exceeds said reference signal and for providing said ignition enabling signal to said ignition means;

processing means for generating said adjusted speed signal by modifying said turbine speed signal in response to said ambient air temperature signal; and second sensing means for sensing the ambient air pressure and for generating an ambient air pressure signal wherein said processing means for generating said adjusted speed signal also modifies said turbine speed signal in response to said ambient air pressure signal.

2. The apparatus of claim 1, wherein said sensor means comprises a thermocouple positioned to measure air temperature at the compressor inlet.

3. The apparatus of claim 1, further comprising bias means, said bias means comprising a look-up table representative of the difference between optimum turbine ignition speed and that turbine speed necessary for optimum ignition air flow to exist in said combustion turbine at the sensed ambient air temperature.

4. An electric power plant, comprising:

a combustion turbine having a shaft, said combustion turbine being operative to turn said shaft in response to the combustion of fuel in said turbine and said combustion turbine having ignition means to ignite said fuel in response to an ignition enabling signal;

a generator connected to said shaft so that electric power is produced when said turbine shaft turns;

first reference means for generating a speed signal representative of actual turbine speed;

sensor means for sensing the temperature of ambient air and for generating an ambient air temperature signal;

second reference means for generating a second reference signal representative of the turbine speed at which optimum air flow exists for ignition of said combustion turbine;

comparator means for comparing said second reference signal to an adjusted speed signal, for generating said enabling signal when said adjusted speed signal exceeds said second reference signal and for providing said ignition enabling signal to said ignition means;

processing means for generating said adjusted speed signal by modifying said turbine speed signal in response to said ambient air temperature signal; and second sensing means for sensing the ambient air pressure and for generating an ambient air pressure signal wherein said processing means for generating said adjusted speed signal also modifies said turbine speed signal in response to said ambient air pressure signal.

5. The apparatus of claim 4, wherein said sensor means comprises a thermocouple positioned to measure air temperature at the compressor inlet.

6. The apparatus of claim 4, wherein said processing means comprises summing means for summing said turbine speed signal with a bias speed factor and bias means for generating said bias speed factor in response to said ambient air temperature signal.

7. The apparatus of claim 6, wherein said bias means comprises a look-up table representative of the difference between optimum turbine ignition speed and that turbine speed necessary for optimum ignition air flow to exist in said combustion turbine at the sensed ambient air temperature.

8. A method for generating an ignition enabling signal for use with a given combustion turbine, wherein a turbine speed signal is given and wherein said combustion turbine includes ignition means for igniting said turbine in response to an ignition enabling signal, said method comprising the steps of:

sensing the temperature of ambient air and for generating an ambient air temperature signal;

generating a reference signal representative of the turbine speed at which optimum air flow exists for ignition of said combustion turbine;

generating an adjusted speed signal by modifying said turbine speed signal in response to said ambient air temperature signal; and comparing said reference signal to said adjusted speed signal, generating said ignition enabling signal when said adjusted speed signal reaches said reference signal and providing said ignition enabling signal to said ignition means; and sensing the ambient air pressure, generating an ambient air pressure signal, generating a bias speed factor in response to said ambient air pressure signal, wherein said bias speed factor is also added to said turbine speed signal by said step of summing.

9. The method of claim 8, wherein the step of sensing said ambient air temperature comprises positioning a thermocouple to measure air temperature at the compressor inlet.

10. The method of claim 8, wherein the step of generating an adjusted speed signal comprises summing said turbine speed signal with a second bias speed factor and generating said second bias speed factor in response to said ambient air temperature signal.

11. The method of claim 10, wherein said step of generating said second bias speed factor comprises the step of providing a look-up table representative of the difference between optimum turbine ignition speed and that turbine speed necessary for optimum ignition air flow to exist in said combustion turbine.

12. The apparatus of claim 1, wherein said processing means comprises summing means for summing said turbine speed signal with a bias speed factor and bias means for generating said bias speed factor in response to said ambient air temperature signal and second bias means for generating a second bias speed factor in response to said ambient air pressure signal, wherein said second bias speed factor is also added to said turbine speed signal by said summer means.

13. The apparatus of claim 6, further comprising second bias means for generating a second bias speed factor in response to said ambient air pressure signal, wherein said second bias speed factor is also added to said turbine speed signal by said summer means.

* * * * *